3,475,446
N-(5-NITRO-2-THIAZOLYL)-CYCLOALKANE-CARBOXAMIDES

David B. Capps, Ann Arbor, Mich., assignor to Parke, Davis & Company, Detroit, Mich., a corporation of Michigan
No Drawing. Filed June 27, 1967, Ser. No. 649,132
Int. Cl. C07d 91/34; A61k 27/00
U.S. Cl. 260—306.8       3 Claims

ABSTRACT OF THE DISCLOSURE

N - (5 - nitro - 2 - thiazolyl)cycloalkanecarboxamides are described in which the cycloalkane group is a small ring containing either 3 or 4 carbon atoms. The compounds can be produced by reacting 2-amino-5-nitrothiazole with a reactive derivative of a cycloalkanecarboxylic acid; or by reacting an N-(2-thiazolyl)cycloalkanecarboxamide with a nitrating agent. The compounds are trichomonacides and amebacides and are also active against other parasites.

SUMMARY AND DETAILED DESCRIPTION

The present invention relates to new organic amides. More particularly, the invention relates to new N-(5-nitro-2-thiazolyl)cycloalkanecarboxamides in which the cycloalkane group is a small ring containing either 3 or 4 carbon atoms; and to methods for their production. The compounds of the invention can be represented by the formula

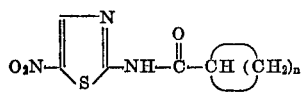

where $n$ represents 2 or 3.

In accordance with the invention, the compounds of the foregoing formula can be produced by reacting 2-amino-5-nitrothiazole of the formula

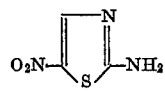

with a reactive derivative of a cycloalkanecarboxylic acid of the formula

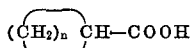

where $n$ is as defined before. Some examples of suitable reactive derivatives of the cycloalkanecarboxylic acids are the acid halides and the acid anhydrides. The preferred reactant is an acid halide and especially the acid chloride. The reactive derivative of the carboxylic acid and the amine can be employed in approximately equimolar quantities although it is customary to use a slight excess of the reactive derivative of the carboxylic acid. The reaction can be carried out in any of a variety of unreactive solvents including tertiary amides such as dimethylformamide, N,N-dimethylacetamide, or N-methyl-2-pyrrolidinone; ketones such as acetone, 2-butanone, or methyl isobutyl ketone; ethers such as dioxane, tetrahydrofuran, or 1,2-dimethoxyethane; acetonitrile, or dimethyl sulfoxide. A preferred solvent is a mixture of dimethylformamide and acetone. A base can also be present, and is desirably present in sufficient quantity to serve as an acid binding agent in those cases where an acid halide is a reactant. Some examples of suitable bases for this purpose are triethylamine, tributylamine, N,N-dimethylaniline, pyridine, other tertiary amines, or inorganic bases. A preferred base is pyridine. Depending on the particular reactive derivative used, the time and temperature of the reaction can be varied over relatively wide limits. In general, the conditions used are a temperature from about —25 to 100° C. or the reflux temperature of the solvent, and a reaction time from about 10 minutes to 5 hours or more. Using the preferred acid chloride, the recommended temperature range for carrying out the reaction is between 0 and 40° C. In this temperature range the reaction is substantially complete within about 30 minutes or less to 2 hours.

Also in accordance with the invention, the compounds of the invention can be produced by reacting an N-(2-thiazolyl)cycloalkanecarboxamide of the formula

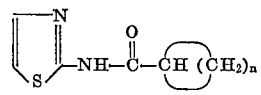

with a nitrating agent; where $n$ is as defined before. The preferred nitrating agent is fuming nitric acid in sulfuric acid. The sulfuric acid functions as a solvent and an additional solvent is neither required nor desirable. The N-(2-thiazolyl)cycloalkanecarboxamide and the nitrating agent can be employed in approximately equimolar quantities although it is preferable to use a moderate excess of the nitrating agent. The reaction proceeds at a satisfactory rate at relatively low temperatures and is exothermic, and thus external heating is not required. In general, the reaction is carried out within a temperature range of about —20 to 60° C. According to the preferred method of carrying out the reaction, the N-(2-thiazolyl)cyclopropanecarboxamide is dissolved in cold sulfuric acid and the nitric acid is added gradually at a temperature of 0–10° C. over a period of 1 hour. When the exothermic reaction subsides, the mixture is allowed to warm slowly to about 20–30° C. and the reaction product isolated.

The N-(2-thiazolyl)cycloalkanecarboxamides required as starting materials in the foregoing process can be prepared by any of a variety of methods. For example, they can be prepared by reacting 2-aminothiazole with a cycloalkanecarbonyl chloride of the formula

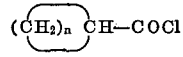

in benzene containing pyridine or other tertiary amine to serve as acid acceptor; where $n$ is as defined before.

The compounds of the invention are useful as antiparasitic agents and as chemical intermediates. They are trichomonacides and amebacides. Their activities can be quantitatively measured in standard tests against *Trichomonas vaginalis* and against *Endamoeba histolytica*. The compounds of the invention are also suppressive against *Trypanosoma cruzi*, the causative organism of Chagas' disease. In addition they are very effective against enterohepatitis, the so-called blackhead disease of turkeys caused by *Histomonas meleagridis*. For amebacidal use, the preferred compound of the invention because of its high amebacidal potency is N-(5-nitro-2-thiazolyl)cyclopropanecarboxamide. The compounds of the invention are effective on either oral or parenteral administration and, in general, oral administration is preferred. For veterinary purposes they can be admiinstered in the diet, for example at a diet concentration of 0.05% in the treatment of turkeys.

The invention is illustrated by the following examples.

EXAMPLE 1

With stirring and external cooling to maintain the temperature at 3–7° C., a solution of 12.5 g. of cyclopropanecarbonyl chloride in 50 ml. of acetone is added over a period of 15 minutes to a solution of 14.5 g. of 2-amino-5-nitrothiazole and 9.7 ml. of pyridine in 70 ml. of dimethylformamide. The resulting mixture is allowed to warm to room temperature over a period of 1 hour and is then poured into 1.5 liters of ice water. The insoluble product is collected on a filter, washed with water, and dierd. It is N-(5-nitro-2-thiazolyl)cyclopropanecarboxamide; M.P. 325-237.5° C. following crystallization from ethyl acetate-isooctane.

EXAMPLE 2

A sodium is prepared by dissolving 14.3 g. of 2-amino-5-nitrothiazole and 9.0 ml. of pyridine in 70 ml. of dimethylformamide. With stirring and external cooling, a solution of 12.3 g. of cyclobutanecarbonyl chloride in 50 ml. of acetone is added over a period of 20 minutes at 3-7° C. The resulting mixture is allowed to warm to room temperature over a period of 1 hour and is then poured into 1.5 liters of ice water. The insoluble product is collected on a filter, washed with water, and dried. It is N - (5 - nitro - 2 - thiazolyl)cyclobutanecarboxamide; M.P. 200-203° C. following crystallization from ethyl acetate-isooctane.

EXAMPLE 3

A solution is prepared by dissolving 5 g. of N-(2-thiazolyl)cyclopropanecarboxamide in 15 ml. of concentrated sulfuric acid at 0° C. With stirring and external cooling to maintain the temperature at 0° C., 1.74 ml. of fuming nitric acid is added dropwise over a period of 1 hour. The resulting mixture is stirred and allowed to warm to room temperature over a period of 3 hours and then poured into ice water. The insoluble product is collected, washed with water, and dried. It is N-(5-nitro-2-thiazolyl)cyclopropanecarboxamide; M.P. 235-237.5° C. following crystallization from ethyl acetate-isooctane.

By the foregoing procedure, with the substitution of an equivalent amount of N-(2-thiazolyl)cyclobutanebaroxamide for the N-(2-thiazolyl)cyclopropanecarboxamide, the product is N-(5-nitro-2-thiazolyl)cyclobutanecarboxamide; M.P. 200-203° C. following crystallization from ethyl acetate-isooctane.

The starting materials can be obtained as follows.

With stirring, 25 g. of cyclopropanecarbonyl chloride is added dropwise over a period of 1 hour to a suspension of 24 g. of 2-aminothiazole and 19.3 ml. of pyridine in 120 ml. of benzene. During the addition, the temperature rises from room temperature to approximately 53° C. and a solid product precipitates. The mixture is allowed to stand overnight and the solid product is collected on a filter, suspended in cold water, again collected on a filter, and dried. It is N-(2-thiazolyl)cyclopropanecarboxamide; M.P. 163-164.5° C. following crystallization from isopropyl alcohol. In the same manner, using an equivalent amount of cyclobutanecarbonyl chloride in place of the cyclopropanecarbonyl chloride, the product is N-(2-thiazolyl)cyclobutanecarboxamide.

I claim:
1. A compound of the formula

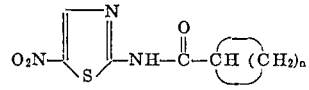

where $n$ is a member of the class consisting of 2 and 3.

2. A compound according to claim 1 which is N-(5-nitro-2-thiazolyl)cyclopropanecarboxamide.

3. A compound according to claim 1 which is N-(5-nitro-2-thiazolyl)cyclobutanecarboxamide.

References Cited
UNITED STATES PATENTS

| | | | |
|---|---|---|---|
| 3,107,251 | 10/1963 | Brown et al. | 260—306.8 |
| 3,277,107 | 10/1966 | Neighbors | 260—306.8 |
| 3,282,927 | 11/1966 | Montzka | 260—306.8 |
| 3,391,153 | 7/1968 | Meier et al. | 260—306.8 |

ALEX MAZEL, Primary Examiner
R. J. GALLAGHER, Assistant Examiner

U.S. Cl. X.R.
424—270